(12) United States Patent
Chau et al.

(10) Patent No.: US 7,093,478 B2
(45) Date of Patent: Aug. 22, 2006

(54) METHOD FOR CALIBRATING ACCELEROMETER SENSITIVITY

(75) Inventors: Kevin H.-L. Chau, Andover, MA (US); Howard R. Samuels, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 153 days.

(21) Appl. No.: 10/887,290

(22) Filed: Jul. 8, 2004

(65) Prior Publication Data

US 2006/0005603 A1    Jan. 12, 2006

(51) Int. Cl.
*G01P 21/00*    (2006.01)
(52) U.S. Cl. ....................................................... 73/1.38
(58) Field of Classification Search ................ 73/1.38, 73/514.26–514.38
See application file for complete search history.

(56) References Cited

U.S. PATENT DOCUMENTS

| | | |
|---|---|---|
| 5,103,667 A | 4/1992 | Allen |
| 5,465,604 A | 11/1995 | Sherman |
| 5,621,157 A | 4/1997 | Zhao |
| 5,880,369 A | 3/1999 | Samuels |
| 6,282,960 B1 | 9/2001 | Samuels |
| 6,698,269 B1 * | 3/2004 | Baber et al. .................. 73/1.08 |

OTHER PUBLICATIONS

Benoit Charlot et al; Electrically Induced Stimuli For MEMS Self-Test; VLSI Test Symposium 2001.

* cited by examiner

*Primary Examiner*—Robert Raevis
(74) *Attorney, Agent, or Firm*—Bromberg & Sunstein LLP

(57) ABSTRACT

A method for calibrating the sensitivity of a micromachined differential-capacitor accelerometer without applying mechanical stimulation, such as shaking. The accelerometer is fabricated with dimensional control structures so that a dimensional relationship is set-up among operational features of the device. The method includes measuring the resonant frequency of a movable mass and measuring the change in the output signal of the accelerometer as the mass is displaced by electrostatic means. The sensitivity of the accelerometer is then calculated.

17 Claims, 2 Drawing Sheets

METHOD FOR CALIBRATING ACCELEROMETER SENSITIVITY

TECHNICAL FIELD

The present invention relates to methods of calibrating the sensitivity of capacitive accelerometers, particularly micromachined differential-capacitor accelerometers.

BACKGROUND

Micromachined structures are frequently used as sensors or actuators and micromachined accelerometers, in particular, are widely used to detect and measure acceleration, tilt, or vibration for many applications. Among micromachined accelerometers, the differential capacitor type is typically used.

A differential-capacitor based accelerometer typically includes a micromachined sensor and its excitation and readout electronics. The micromachined sensor typically includes several primary micromachined elements; a movable mass, support springs, and capacitor plates for sensing the displacement of the movable mass. Often, additional actuator plates are provided to implement a self-test function. FIG. 1 shows an exemplary prior art differential-capacitor acceleration sensor 300. The movable mass 302, supported by springs 314, 316, 318, 320, is positioned midway between two plates so that one capacitor is formed by a first plate and the mass and a second (and equal) capacitor is formed by a second plate and the mass. Together these form the differential capacitor for sensing the displacement of the movable mass. To maximize the accelerometer capacitance, the mass may contain numerous fingers 350 that are interleaved between fingers from the two plates 348, 352. Likewise is the construction of the actuator plates 360, 362. These plates are used to generate electrostatic forces via a voltage applied, for example, between the fingers of the actuator plate 360 and the fingers 358 of the mass 302. The electrostatic force deflects the mass 302 and produces an output response that can be used for self-testing or other test purposes, e.g., measuring the resonant frequency of the movable spring-mass system.

The sensitivity of a micromachined accelerometer is determined by a variety of factors, including spring constant, mass of certain elements (e.g., proof mass), sense and parasitic capacitances, and electronic gain. As a result of the small dimensions involved, (on the order of micrometers), the sensitivity of a micromachined accelerometer may vary significantly due to manufacturing variations which alter dimensions of micromachined structures within the accelerometer. Among these, spring constant and sense capacitance see the most variations. Accordingly, some post-manufacturing calibration is typically required. Effective calibration requires an accurate determination of sensitivity followed by, if necessary, electronic gain adjustments in the form of EPROM programming, laser trimming, or electrical fusing of circuit elements, to bring sensitivity to target.

Commonly, the sensitivity of these accelerometers is measured with a device that shakes the accelerometer either at the wafer or the packaged device stage of manufacturing. Alternatively, the orientation of the accelerometer can be changed precisely with respect to the gravitational field, for example, with a rotator and the output response can then be calibrated to gravity. Testing involving precise mechanical excitations is very costly, especially if it is required to be performed over temperature. It is the main obstacle barring micromachined accelerometers from realizing the low cost of standard IC testing. A method of accurately measuring the sensitivity of these accelerometers without requiring equipment for mechanical manipulation of these devices (e.g., shaking) could significantly reduce manufacturing costs.

SUMMARY OF THE INVENTION

In an embodiment of the present invention, a method is provided for calibrating the sensitivity of a micromachined differential-capacitor accelerometer over temperature. The accelerometer provided includes a substrate and a movable mass suspended over the substrate by a supporting spring. The movable mass includes a movable electrode. First and second fixed electrodes are suspended over the substrate and not movable relative to the substrate. The movable electrode and the first and second fixed electrode form a differential capacitor. An excitation and signal conditioning circuitry is provided to generate an amplified signal proportional to the displacement of the movable mass. An actuator is provided that displaces the mass by electrostatic means when activated. A dimensional relationship is established between the actuator electrode gap and the spring width so that operational characteristics of the actuator and spring are coupled. The method includes measuring the resonant frequency of the movable spring-mass system, displacing the mass with the actuator, measuring the change in the amplified signal and calculating the sensitivity of the accelerometer. In specific embodiments of the invention, calculating the sensitivity of the accelerometer includes calculating an acceleration equivalent to displacing the movable mass with the actuator. In certain embodiments of the invention, the electronic gain is then adjusted by EPROM programming, laser trimming, electrical fusing of circuit elements or similar methods to bring sensitivity to a target value.

In another embodiment of the invention, a self-calibrating accelerometer is provided that includes logic and electronics to perform the method of the preceding embodiment of the invention.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In certain embodiments of the invention, the sensitivity of a micromachined differential-capacitor accelerometer can be determined without external mechanical excitation (e.g., shaking). To that end, the resonant frequency of the accelerometer's movable spring-mass system is measured. The change in output voltage of the accelerometer as the movable mass is displaced by an electrostatic force is also measured. The sensitivity of the device is then calculated. In these embodiments, sensitivity is determined without external mechanical excitation by exploiting dimensional relationships between components of the device. These relationships may be provided by dimensional control structures fabricated in the accelerometer or by uniform spacing of components. U.S. Pat. Nos. 5,880,369 and 6,282,960, which are incorporated herein by reference in their entirety, disclose methods of including such dimensional control structures in accelerometers.

An open-loop accelerometer typically comprises a spring-mass system, which moves in response to an input acceleration, and a displacement sensor that converts the motion of the movable mass into an electrical output. A typical accelerometer also includes actuator fingers, which generate an electrostatic force to displace the movable mass upon an external electrical input. Such actuators are typically employed to provide a self-test feature for the accelerometer.

Figure 1:
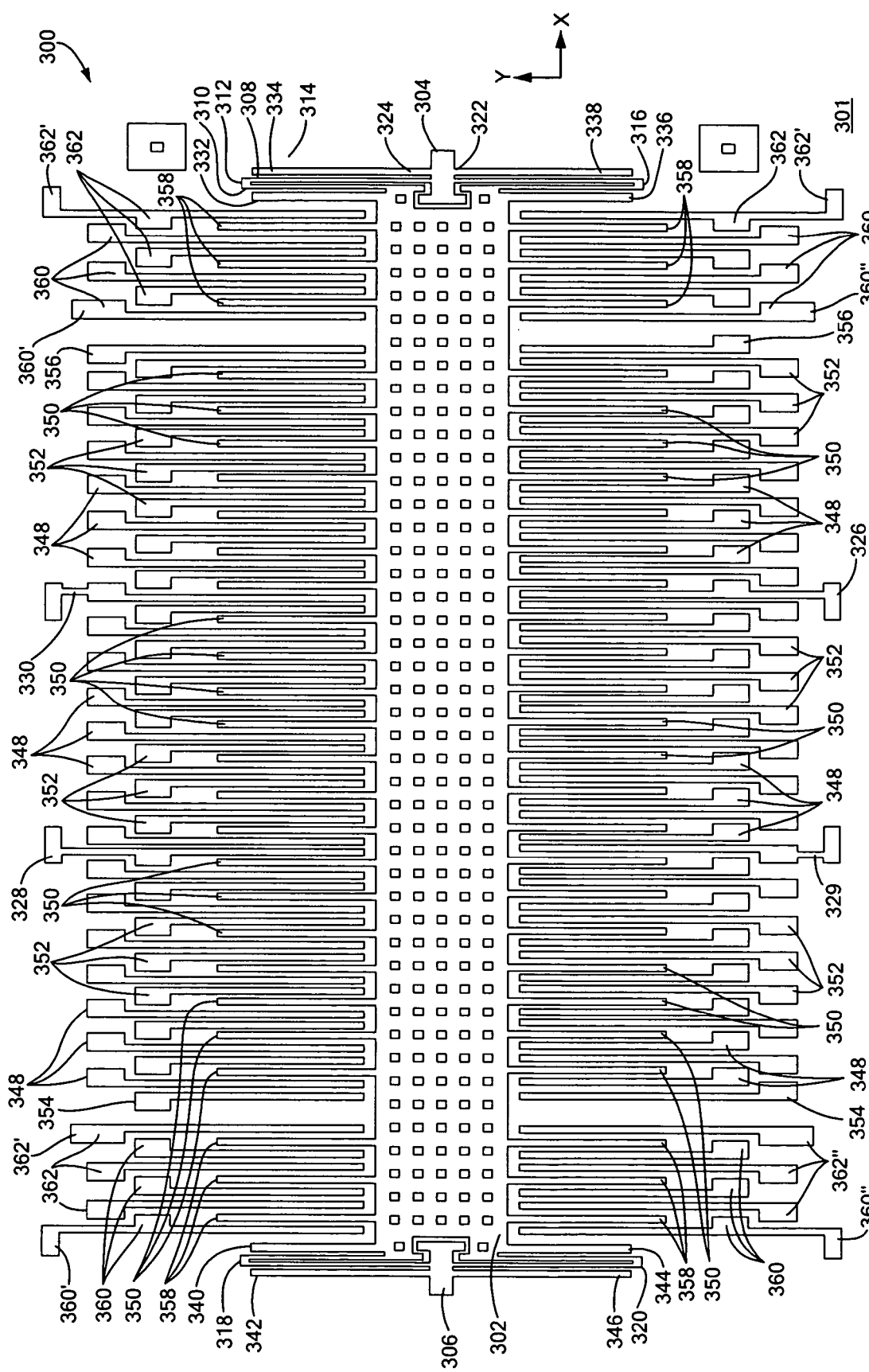
FIG. 1 is a diagram of a prior art accelerometer.

FIG. 1 illustrates a prior art micromachined sensor 300, which may be used in embodiments of the present invention. A movable mass 302 is a polysilicon structure suspended above a bootstrap diffusion layer (not shown) disposed within an underlying substrate 301. Mass 302 is approximately 467 micrometers long and 57 micrometers wide. (The dimensions provided herein are merely exemplary and in no way limiting.) The bootstrap diffusion layer is formed from an n+ doped emitter diffusion region in the substrate. Mass 302 is approximately parallel to the surface of substrate 301.

Mass 302 is connected to anchors 304 and 306 through folded springs 314, 316 and 318, 320, respectively. Springs 314–320 are formed from polysilicon. Anchors 304, 306 are "T" shaped with a vertical portion 322 having an approximate length and width of 28.7 and 9.7 micrometers, respectively, and a horizontal crossing portion 324 having an approximate length and width of 21.7 and 4.7 micrometers, respectively. Anchors 304 and 306 are mounted on the substrate outside the bootstrap diffusion layer through small rectangular regions at the bottom of the "T". (The rest of the T is suspended above substrate 301.)

Springs 314–320 consist of legs 308, 310 and 312, all of which are approximately 2.2 micrometers wide. Long legs 308 and 310 are parallel to each other, connected at one (i.e., "external") end by short leg 312. The other (i.e., "internal") ends of long legs 308 and 310 are connected to an anchor (e.g., 304 or 306) and mass 302, respectively. Long legs 308 and 310 are flexible, allowing mass 302 to move along the X-axis (passing through anchors 304 and 306) in response to a force along the X-axis, as the internal ends of long segments 308 and 310 move closer together or further apart. Long segments 308 and 310 are approximately 116.7 and 98.2 micrometers long, respectively, and are separated by a gap of approximately 1.3 micrometers. Alternatively, other shapes can be used for the springs.

Disposed to the left and right of each spring 314–320 is a first dimensional-control structure (i.e., a dimensional-control finger) as shown in FIG. 1. Specifically, internal dimensional-control fingers 332, 336 (coupled to mass 302) are disposed to the left of springs 314 and 316, respectively. Further, a set of second dimensional-control fingers 334, 338 (coupled to anchor 304) are disposed to the right of springs 314 and 316, respectively. This same relationship exists for springs 318 and 320, where external dimensional-control fingers disposed to the left (i.e., 342 and 346, respectively) are coupled to anchor 306 while internal dimensional-control fingers disposed to the right (i.e., 340 and 344, respectively) are coupled to mass 302.

The distance between each dimensional-control finger and associated spring is approximately 1.3 micrometers and the width of each dimensional-control finger is approximately 3.7 micrometers. The length of fingers 332, 336, 340 and 344 is approximately 94.5 micrometers, and the length of fingers 334, 338, 342 and 346 is approximately 118 micrometers.

Extending from the sides of mass 302 along the Y-axis are parallel polysilicon sense fingers 350. In sensor 300, sense fingers 350 are substantially similar (i.e., substantially the same shape and dimension); each being approximately 3.4 micrometers wide and approximately 109 micrometers long. As shown in FIG. 1, there are 21 sense fingers on each side of mass 302.

To the left and right (along the X-axis) of each sense finger 350, and not connected to mass 302, is a left fixed finger 348 and a right fixed finger 352, respectively. These fixed fingers are formed from polysilicon and anchored to substrate 301. Preferably, the inner set of fixed fingers and outer set of fixed fingers on each side of mass 302 are approximately 124 and 144 micrometers long, respectively. Each finger 348, 352 is approximately 3.4 micrometers wide and each is separated from an adjoining sense finger 350 by a gap of approximately 1.3 micrometers. Adjoining left and right fixed fingers 348 and 352 are also spaced approximately 1.3 micrometers apart, although this dimension is not as critical as the dimensions on either side of finger 350. Rather than being limited by dimensional control, the distance between fingers 348 and 352 is controlled by an electrical parameter; i.e., this distance must not be so large as to affect the electric field lines on the inside of gaps between fingers 350–348 and 350–352.

All of the left fixed fingers 348 on each side of mass 302 are connected together through a heavily n+ doped polysilicon region, as are all of the right fixed fingers 352 (regions not shown). Electrical connection to the inner set of fixed fingers on each side of mass 302 is made with polysilicon microbridges 326 and 328. Similarly, electrical connection to the outer set of fixed fingers on each side of mass 302 is made with polysilicon microbridges 329 and 330.

Referring to FIG. 1, sense fingers 350 (which form a single electrical node with movable mass 302) collectively form the center electrode of a differential sense capacitor. Left fixed fingers 348 form the left electrode and right fixed fingers 352 form the right electrode of the differential capacitor. Preferably, the left capacitor and the right capacitor have the same capacitance. Each set of one sense finger 350 and its adjoining left fixed finger 348 and right fixed finger 352 forms one "cell" of the differential capacitor, with all of the cells substantially similar and connected in parallel.

When mass 302 moves to the right relative to fixed fingers 348 and 352 (in response to force applied along the X-axis), the distance between each sense finger 350 and the right fixed finger 352 of the same cell decreases, which increases the capacitance of the right capacitor. At the same time, the distance between each sense finger 350 and the left fixed finger 348 of the same cell increases, decreasing the capacitance of the left capacitor.

Mass 302 is connected to resolving circuitry through a heavily n+ doped region of polysilicon, which extends from anchor 304. An example of resolving circuitry and a discussion of acceleration sensor operation is provided in U.S. Pat. No. 5,345,824, which is incorporated herein by reference.

To the left of the leftmost left fixed finger 348 on each side of mass 302 is a right dummy finger 354. Similarly, to the right of the rightmost right fixed finger 352 on each side of mass 302 is a left dummy finger 356. These dummy fingers are connected to their corresponding fixed fingers (i.e., right dummy fingers 354 are connected to right fixed fingers 352 and left dummy fingers 356 are connected to left fixed fingers 348). This ensures that end cells of the differential capacitor behave the same as the middle cells. More specifically, dummy fingers 354 and 356 are installed to ensure that the electric field present at the leftmost left fixed fingers 348 and rightmost right fixed fingers 352, respectively, are the same as the electric fields found at the "middle" left and right fixed fingers 348, 352 (e.g., between microbridges 326 or 328 and 330).

The distances between (1) right dummy fingers 354 and leftmost left fixed finger 348, and (2) left dummy fingers 356 and rightmost right fixed finger 352 are subject to the same limitation. Specifically, these distances must not be so large as to affect the electric field lines on the inside of gaps between fingers 350–348 and 350–352.

At both ends of mass 302 are 6 polysilicon self-test fingers 358 (i.e., a total of 12). These fingers are approximately 3.7 micrometers wide and 109 micrometers long. Self-test fingers 358 are part of the same electrical node as sense fingers 350 and the body of mass 302. To the sides of each self-test finger 358, and not connected to mass 302, are a left and a right polysilicon actuator finger 360 and 362, respectively. When no force is applied to mass 302, self-test fingers 358 are midway between actuator fingers 360 and 362, resulting in a distance between fingers 358 and adjoining actuator fingers 360, 362 of approximately 1.3 micrometers.

The inner sets of actuator fingers 360, 362 are approximately 124 micrometers long. Additionally, the outer sets of actuator fingers 360, 362 are approximately 144 micrometers long. Both fingers are approximately 3.7 micrometers wide and anchored to substrate 301. Actuator fingers 360 are coupled to each other via heavily doped n+polysilicon regions (not shown) and electrically coupled via polysilicon microbridges 360' and 360". Similarly, actuator fingers 362 are coupled to each other via heavily doped n+ polysilicon regions (not shown) and electrically coupled via polysilicon microbridges 362' and 362".

The actuator fingers 360, 362 are used to generate electrostatic forces to self-test fingers 358 to deflect movable mass 302 for self-testing or other test purposes, e.g., measuring the resonant frequency of the movable spring-mass system. More specifically, a static voltage may be applied between actuator fingers 360 and self-test fingers 358, the electrostatic attractive force thus generated deflects the mass 302 toward actuator fingers 360. Similarly, a static voltage applied between actuator fingers 362 and self-test fingers 358 deflects the mass 302 toward actuator fingers 362. In either case, a static output response is produced by the readout electronics as if mass 302 is deflected by an input acceleration. The sign and magnitude of the output response may serve as an indication that the sensor is operating properly. Alternatively, an alternating voltage, e.g., of square or sinusoidal waveform, may be applied to the actuator fingers, e.g. 360, and the frequency of the alternating voltage may be swept in the neighborhood of the spring-mass resonant frequency. The movable mass deflection and therefore the output response will peak at the resonant frequency. Detecting this peak response thus provides a method by which the resonant frequency of the spring-mass system can be accurately determined.

Capacitor fingers 348–362 and springs 314–320 are "operating" structures; i.e., they provide an operating function (e.g., electrical or mechanical) and may also provide dimensional control through consistent spacing. In contrast, fingers 332–346 are dimensional control structures; i.e., their sole purpose is to provide dimensional control through the creation of consistent spacing at select locations within the device (e.g., next to electrical operating structures, mechanical operating structures, etc.). Sensor 300 is constructed so that certain critical spacing dimensions are uniformly maintained at a predefined distance; i.e., spacing between actuator and self-test fingers (i.e., between fingers 358–360 and 358–362) and spacing between and bordering spring legs 308 and 310. This is achieved by ensuring existing operating structures (e.g., fingers 358–362 and spring legs 308, 310) are configured to maintain uniform distances between each other (such as by reducing the distance between legs 308 and 310 to approximately the same distance as between fingers 358–360 and 358–362) and by adding certain dimensional-control structures (e.g., fingers 332–346), which establish these same uniform distances at select locations within the sensor.

The dimensional-control structures in sensor 300 create a spacing environment (i.e., spacing bordering legs 308, 310) with structures (i.e., internal and external fingers 332–346) that differ from other conventional structures. These structures establish a dimensional relationship (i.e., uniform spacing) between functionally and physically different micromachined structures (i.e., fingers and springs). As noted above, the uniform spacing between actuator and self-test fingers 358–362 and the uniform spacing between folded spring legs 308, 310 are both approximately 1.3 micrometers. This uniform spacing dimension, which represents a predefined distance selected by a designer, is created from a mask spacing of about 1.0 micrometers.

Referring to FIG. 1, every self-test finger 358 is longitudinally bordered by left actuator finger 360 and right actuator finger 362. Accordingly, each self-test finger 358 is longitudinally bordered by a uniform space or gap of approximately 1.3 micrometers. Additionally, all spring legs 308 and 310 are disposed next to each other maintaining the same uniform distance of approximately 1.3 micrometers. These legs are longitudinally bordered by an internal dimensional-control finger (i.e., 332, 336, 340 or 344) and external dimensional-control finger (i.e., 334, 338, 342 or 346). Accordingly, each spring leg 308 or 310 is longitudinally bordered by a uniform space or gap of approximately 1.3 micrometers.

The spacing uniformity maintained in sensor 300 represents a beneficial dimensional relationship between structures disposed within this device. This relationship facilitates correlation of dimensional variation between functionally and/or physically different micromachined structures. Physically different structures are those having different dimensions and/or shapes (e.g., fingers 358 and springs 314–320). Similarly, this relationship facilitates correlation of dimensional variation between functionally and/or physically similar micromachined structures. Physically similar structures are those having substantially similar dimensions and shape (e.g., a plurality of fingers 358). By maintaining uniform spacing between and among actuator and self-test fingers and, for example, uniform spacing between folded spring legs, manufacturing processes applied to both structures (e.g., etching or photolithography) and variations in such processes (e.g., over etching) affect the physical dimensions of these structures (e.g., spring width and finger width) in a highly correlated manner.

The dimensional-control features illustrated by the micromachined sensor 300 in FIG. 1 represent only one example of an applicable configuration. These features may also be configured in more complex shapes, such as in a series of folds like springs (see FIG. 4 in U.S. Pat. Nos. 5,880,369 and 6,282,960). The movable mass in this case is not constrained to move in one direction and the sensor may be configured as an accelerometer capable of sensing acceleration in multiple axes.

In an embodiment of the invention, an electrostatic force is generated on the movable mass by the actuator fingers upon an external electrical command. An expression for this force, $F_E$, is $$F_E = \frac{\varepsilon_0 K_F h L V_A^2}{2d^2} \quad (1)$$

where $\varepsilon_0$ is the permittivity of the gas surrounding the movable mass and the actuator fingers, $K_F$ is the capacitance fringing factor, h is the actuator finger thickness, L is the total actuator finger length, d is the actuator finger gap, and $V_A$ is the applied actuation voltage across the gap.

This force is equivalent to that produced by an external acceleration, $a_E$, on the movable mass, m, given by $$a_E = \frac{F_E}{m} \quad (2)$$

The mass can be further expressed as $$m = \rho h A \quad (3)$$

where $\rho$ is the density, h is the thickness, and A is the area of the movable mass. Here the thickness of the movable mass and that of the actuator fingers are identical by design. This is desirable as the resulting expression for the equivalent acceleration, obtained by substituting equations 1 and 3 into 2, is insensitive to thickness variations:

$$a_E = \frac{\varepsilon_0 K_F L V_A^2}{2 \rho A d^2} \quad (4)$$

The equivalent acceleration has two desirable properties that make it suitable to be used for sensitivity calibration. First of all, it has a precise squared relationship with the actuation voltage $V_A$, which can be adjusted to generate the appropriate acceleration level for the particular accelerometer. In practice, $V_A$ may be designed to be a constant fraction, e.g., 50%, of the external supply voltage that can be controlled precisely. Secondly, the equivalent acceleration $a_E$ remains substantially unchanged over temperature. This is because the temperature coefficients of thermal expansion of the dimension related terms, namely: L, A, d, and $\rho$, cancel each other in the expression for the equivalent acceleration. The remaining terms in the expression have negligible variations over temperature. As a result, it is found that the equivalent acceleration $a_E$ may change by less than 1%, for example, over a 100° C. temperature range, making it well suited for the sensitivity calibration of an accelerometer over a wide temperature range.

The equivalent acceleration $a_E$, however, suffers a significant drawback in that it is very sensitive to manufacturing process variations. Due to the nature of micromachining, the actuator gap d, which is typically 1.3 micrometers in size, can vary by as much as ±0.2 micrometers from part to part. As a result of the $d^2$ relationship in equation 4, the manufacturing variations in the equivalent acceleration can be as much as ±30%. The same ±0.2 micrometer variations also occur in the other two dimensional parameters L and A. However, since these dimensions are hundreds of micrometers in size, L and A can be considered constants as the impact of their manufacturing variations on the equivalent acceleration $a_E$ is negligible. As a result of the extremely large manufacturing variations in the equivalent acceleration, $a_E$ (mainly through variations in the actuator finger gap d), the primary use of the actuator has been limited to a self-test function, which can only serve as an indication that the accelerometer is operational but is totally unsatisfactory for the accurate calibration of sensitivity.

By including dimensional-control structures in the accelerometer design for at least the actuator and the springs, a dimensional relationship can be set up between the actuator finger gap and the width of the spring suspensions for the movable mass. This is achieved by having a uniform gap with a known relationship to that for the actuator fingers alongside the entire lengths of the springs in the accelerometer layout. Manufacturing variations on the actuator finger gap will now be accompanied by opposite but highly correlated variations on the width of the spring suspensions. FIG. 1 shows an exemplary accelerometer with such dimensional control structures.

The movable spring-mass resonant frequency $f_0$ is primarily a function of the width of the spring suspensions. As a result of the dimensional control structures, the actuator finger gap d and the resonant frequency can thus be forced to correlate with each other in the presence of manufacturing variations. Consequently, both the actuator finger gap d and the capacitance fringing factor $K_F$, which is primarily a function of d, now become functions of the resonant frequency. As for the other terms in equation 4, $\rho$ and $\varepsilon_0$ are material constants for the accelerometer manufacturing process and do not vary significantly. L and A can be considered constants for the accelerometer manufacturing process as explained earlier due to their relatively large dimensions. As a result, equation 4 can then be further reduced to $$a_E = G(f_0) V_A^2 \quad (5)$$

where all the constant and resonant frequency dependent terms in equation 4 have been incorporated into the function $G(f_0)$. The exact form of $G(f_0)$ can be determined by finite element analysis of the acceleration sensor structure or by empirical means. For example, in one particular design $$G(f_0) = 0.116 - 4.40 \times 10^{-5} f_0 + 5.31 \times 10^{-9} f_0^2 \quad (6)$$

where the units for $G(f_0)$ and $f_0$ are $gV^{-2}$ and Hz, respectively, and g is the acceleration due to gravity, which equals 9.81 $ms^{-2}$. With this method, the equivalent acceleration $a_E$ can be determined to an accuracy of better than ±5% despite an initial ±30% variations from part to part due to manufacturing variations. This is adequate for the sensitivity calibration for most applications. Also for any given part, the equivalent acceleration remains substantially unchanged over a wide temperature range as explained earlier.

As used herein including in the claims appended hereto, unless the context otherwise requires, the term "acceleration gain" shall mean the function $G(f_0)$ as used in equation 5 or its equivalent.

Figure 2:
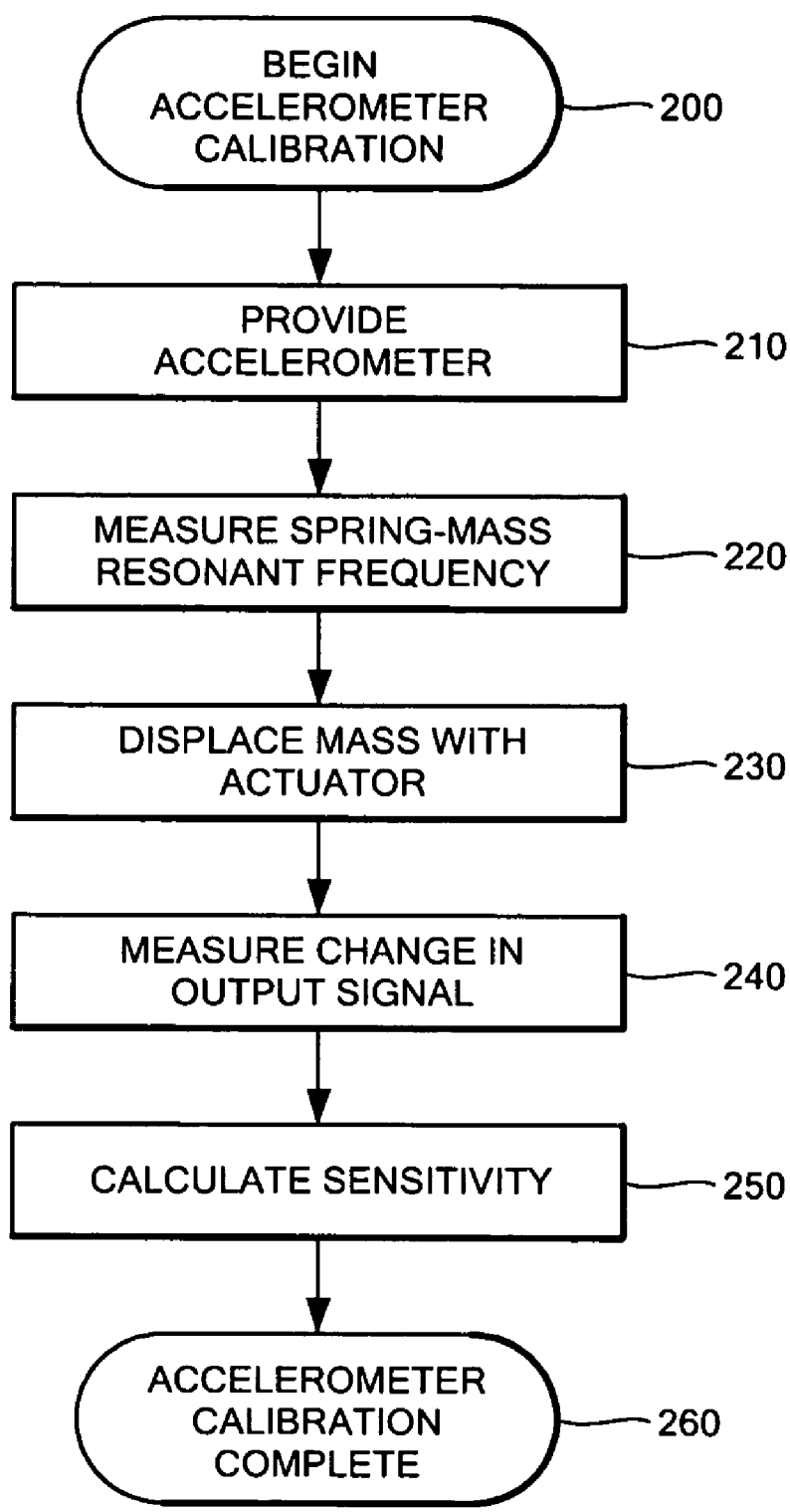
FIG. 2 is a flow diagram for a method of calibrating an accelerometer according to an embodiment of the present invention.

A flow diagram for the method of calibrating 200 the sensitivity of the accelerometer 210 is presented in FIG. 2. Once the resonant frequency is measured 220 by external electrical means as described above, the equivalent acceleration due to actuation can be determined from equations 5 and 6. The accelerometer output change, $\Delta V_O$, due to this actuation is then measured 230, 240. Finally, the sensitivity of the accelerometer can be calculated 250, 260 as $$Sen = \frac{\Delta V_O}{a_E} \quad (7)$$

Note that only two measurements need to be made to determine the sensitivity of the accelerometer. The sensitivity may be expressed as a general function $F(f_0, \Delta V_O)$ of the resonant frequency $f_0$ and the actuation output change $\Delta V_O$ as follows:

$$Sen = F(f_0, \Delta V_0) \quad (8)$$

where the exact form of $F(f_0, \Delta V_O)$ can be determined by finite element analysis of the acceleration sensor structure or by empirical means, e.g. curve fitting the measured sensitivity with the measured resonant frequency and the measured actuation output. Thus, in another embodiment of the invention, the sensitivity of the accelerometer can be determined without the intermediate evaluations of the acceleration gain and the equivalent acceleration, as described above.

Once the sensitivity of the accelerometer is determined, the electronic gain of the readout electronics may be adjusted if necessary in the form of EPROM programming, laser trimming, or electrical fusing of circuit elements, to bring the accelerometer sensitivity to target. Thus, the sensitivity of the accelerometer is calibrated by external electrical excitations without the use of a shaker, rotator, or any other external mechanical means of excitation. Further, this calibration can be performed over a wide temperature range.

After the sensitivity is calibrated, it is suffice to monitor the accelerometer output change $\Delta V_O$ due to actuation to detect any shift in sensitivity and to recalibrate if necessary.

In other embodiments of the invention, a self-calibrating accelerometer is provided. The accelerometer, as described above, includes logic and electronics to perform one of the methods described above and includes the dimensional control structures to facilitate these steps. The accelerometer may be fabricated monolithically or the self-calibration logic and electronics may be implemented in devices separate from the device that measures acceleration. All such arrangements are intended to be within the scope of the invention as described in the appended claims.

It should be noted that a flow diagram is used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

Other variations and modifications of the embodiments described above are intended to be within the scope of the present invention as defined in the appended claims.

What is claimed is:

1. A method of calibrating an accelerometer comprising:
   a. providing the accelerometer comprising:
      i. a substrate;
      ii. a mass suspended over the substrate and movable relative to the substrate, the mass including a movable electrode;
      iii. a first fixed electrode suspended over the substrate and not movable relative to the substrate;
      iv. a second fixed electrode suspended over the substrate and not movable relative to the substrate, the movable electrode and the first and second fixed electrode forming a differential capacitor;
      v. an excitation and readout circuit coupled to the movable electrode and to the fixed electrodes to provide an amplified signal;

vi. an actuator, the actuator suspended over the substrate, the actuator displacing the mass by electrical means when activated; and
vii. a spring suspended over the substrate connected to the mass, the spring and the actuator laid out such that a dimensional relationship is established between the actuator and the spring;
b. measuring the resonant frequency of the mass;
c. displacing the mass with the actuator;
d. measuring the change in the amplified signal; and
e. calculating the sensitivity of the accelerometer including calculating an acceleration equivalent to displacing the mass with the actuator wherein calculating the acceleration includes calculating a function of the resonant frequency, the form of the function determined by the dimensional relationship between the actuator and the spring.

2. A method according to claim 1 wherein calculating the sensitivity of the accelerometer further includes calculating the sensitivity by dividing the change in the amplified signal by the acceleration.

3. A method according to claim 1 wherein calculating an acceleration equivalent to displacing the mass with the actuator includes determining an acceleration gain.

4. A method according to claim 3, wherein the acceleration gain is determined by finite element analysis.

5. A method according to claim 3 wherein the acceleration gain is determined empirically.

6. A method according to claim 3 wherein calculating an acceleration equivalent to displacing the mass with the actuator includes multiplying the acceleration gain by the square of a voltage applied to the actuator.

7. A method according to claim 3 wherein the acceleration gain is a quadratic function of the resonant frequency of the mass.

8. A method according to claim 1 wherein the accelerometer is calibrated without external mechanical excitation.

9. A self-calibrating accelerometer comprising:
a. a substrate;
b. a mass suspended over the substrate and laterally movable relative to the substrate, the mass including a movable electrode;
c. a first fixed electrode suspended over the substrate and not movable relative to the substrate;
d. a second fixed electrode suspended over the substrate and not movable relative to the substrate, the movable electrode and the first and second fixed electrode forming a differential capacitor;
e. an excitation and readout circuit coupled to the movable electrode and to the fixed electrodes to provide an amplified signal;
f. an actuator, the actuator suspended over the substrate, the actuator displacing the mass by electrical means when activated; and
g. a spring suspended over the substrate connected to the mass, the spring and the actuator laid out such that a dimensional relationship is established between the actuator and the spring;
h. logic for
i. measuring the resonant frequency of the mass,
ii. displacing the mass with the actuator,
iii. measuring the change in the amplified signal, and
iv. calculating the sensitivity of the accelerometer, including calculating an acceleration equivalent to displacing the mass with the actuator wherein calculating the acceleration includes calculating a function of the resonant frequency, the form of the function determined by the dimensional relationship between the actuator and the spring.

10. An accelerometer according to claim 9 wherein calculating the sensitivity of the accelerometer further includes calculating the sensitivity by dividing the change in the amplified signal by the acceleration.

11. An accelerometer according to claim 9 wherein the accelerometer is fabricated as a monolithic device.

12. An accelerometer according to claim 9 wherein at least a portion of the logic is located in a device separate from the differential capacitor.

13. An accelerometer according to claim 9 wherein calculating an acceleration equivalent to displacing the mass with the actuator includes determining an acceleration gain.

14. An accelerometer according to claim 13, wherein the acceleration gain is determined by finite element analysis.

15. An accelerometer according to claim 13, wherein the acceleration gain is determined empirically.

16. An accelerometer according to claim 13, wherein calculating an acceleration equivalent to displacing the mass with the actuator includes multiplying the acceleration gain by the square of a voltage applied to the actuator.

17. An accelerometer according to claim 13, wherein the acceleration gain is a quadratic function of the resonant frequency of the mass.

* * * * *